US009264144B2

(12) United States Patent
Yu et al.

(10) Patent No.: US 9,264,144 B2
(45) Date of Patent: Feb. 16, 2016

(54) TRANSMISSION AND RECEPTION OF QUAD-SUBCARRIER ORTHOGONAL FREQUENCY DIVISION MULTIPLEXED SIGNALS

(71) Applicant: ZTE Corporation, Shenzhen (CN)

(72) Inventors: Jianjun Yu, Basking Ridge, NJ (US); Fan Li, Morristown, NJ (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/521,364

(22) Filed: Oct. 22, 2014

(65) Prior Publication Data
US 2015/0110492 A1 Apr. 23, 2015

Related U.S. Application Data

(60) Provisional application No. 61/894,315, filed on Oct. 22, 2013.

(51) Int. Cl.
| | |
|---|---|
| *H04B 10/00* | (2013.01) |
| *H04B 10/60* | (2013.01) |
| *H04L 27/18* | (2006.01) |
| *H04L 27/20* | (2006.01) |
| *H04L 27/36* | (2006.01) |
| *H04J 14/00* | (2006.01) |
| *H04L 27/26* | (2006.01) |

(52) U.S. Cl.
CPC ............... *H04B 10/60* (2013.01); *H04L 27/18* (2013.01); *H04L 27/206* (2013.01); *H04L 27/2614* (2013.01); *H04L 27/2647* (2013.01); *H04L 27/362* (2013.01); *H04J 14/00* (2013.01); *H04L 27/2601* (2013.01)

(58) Field of Classification Search
CPC .............. H04B 10/548; H04B 10/556; H04B 10/5561; H04B 10/612; H04B 10/613; H04B 10/6164; H04B 10/6165
See application file for complete search history.

(56) References Cited

U.S. PATENT DOCUMENTS

2012/0148261 A1* 6/2012 Yu ........................ H04B 10/548
398/193

OTHER PUBLICATIONS

Armstrong, J., "OFDM for Optical Communications," Journal of Lightwave Technology, 27(3):189-204, Feb. 2009.
Cao, Z., et al. "Direct Detection Optical OFDM Transmission System Without Frequency Guard Band," IEEE Photonics Technology Letters, 22(11):736-738, Jun. 2010.
Jansen, S.L, et al., "Coherent Optical 25.8-Gb/s OFDM Transmission Over 4160-km SSMF," Journal of Lightwave Technology, 26(1):6-15, Jan. 2008.
Kobayashi, T., et al., "Over 100 Gb/s Electro-Optically Multiplexed OFDM for High-Capacity Optical Transport Network," Journal of Lightwave Technology, 27(16):3714-3720, Aug. 2009.

(Continued)

*Primary Examiner* — Daniel Dobson
(74) *Attorney, Agent, or Firm* — Perkins Coie LLP

(57) ABSTRACT

A dual-polarization, 4-subcarriers orthogonal frequency division multiplexed signal carrying information bits is transmitted in an optical communication network without transmitting a corresponding pilot tone or training sequence. A receiver receives the transmitted signal and recovers information bits using a blind equalization technique and by equalizing the 4-subcarriers OFDM signal as a 25-QAM signal in time domain with a CMMA (constant multi modulus algorithm) equalization method.

20 Claims, 13 Drawing Sheets

(56) References Cited

OTHER PUBLICATIONS

Li, C., et al., "Investigation of Coherent Optical Multiband DFT-S OFDM in Long Haul Transmission," IEEE Photonics Technology Letters, 24(19):1704-1707, Oct. 2012.

Lowery, A.J., "Improving Sensitivity and Spectral Efficiency in Direct-Detection Optical OFDM Systems," Optical Fiber Communication Conference and Exposition, and the National Fiber Optic Engineers Conference (OFC/NFOEC), San Diego, CA, Paper OMM4, pp. 1-3, Feb. 2008.

Peng, W.-R., et al., "Per-symbol-based digital back-propagation approach for PDM-CO-OFDM transmission systems," Optics Express, 21(2):1547-1554, Jan. 2013.

Peng, W.-R., et al., "Simple Carrier Recovery Approach for RF-Pilot-Assisted PDM-CO-OFDM Systems," Journal of Lightwave Technology, 31(15):2555-2564, Aug. 2013.

Tao, L, et al., "Analysis of Noise Spread in Optical DFT-S OFDM Systems," Journal of Lightwave Technology, 30(20):3219-3225, Oct. 2012.

Wang, H., et al., "APSK Modulated CO-OFDM System With Increased Tolerance Toward Fiber Nonlinearities," IEEE Photonics Technology Letters, 24(13):1085-1087, Jul. 2012.

Yang, Q., et al., "Guard-band influence on orthogonal-band-multiplexed coherent optical OFDM," Optics Letters, 33(19):2239-2241, Oct. 2008.

Yu, J., et al "1.96 Tb/s (21×100 Gb/s) OFDM Optical Signal Generation and Transmission Over 3200-km Fiber," IEEE Photonics Technology Letters, 23(15):1061-1063, Aug. 2011.

Zhang, J., et al., "Improved Quadrature Duobinary System Performance Using Multi-Modulus Equalization," IEEE Photonics Technology Letters, 25(16):1630-1633, Aug. 2013.

Zhang, J., et al., "Multi-Modulus Blind Equalizations for Coherent Quadrature Duobinary Spectrum Shaped PM-QPSK Digital Signal Processing," Journal of Lightwave Technology, 31(7):1073-1078, Apr. 2013.

Zhou, X., et al., "64-Tb/s, 8 b/s/Hz, PDM-36QAM Transmission Over 320 km Using Both Pre- and Post-Transmission Digital Signal Processing," Journal of Lightwave Technology, 29(4):571-577, Feb. 2011.

Zhou, X., et al., "PDM-Nyquist-32QAM for 450-Gb/s Per-Channel WDM Transmission on the 50 GHz ITU-T Grid," Journal of Lightwave Technology, 30(4):553-559, Feb. 2012.

* cited by examiner

TRANSMISSION AND RECEPTION OF QUAD-SUBCARRIER ORTHOGONAL FREQUENCY DIVISION MULTIPLEXED SIGNALS

CROSS REFERENCE TO RELATED APPLICATIONS

This patent document claims the benefit of priority of U.S. Provisional Patent Application No. 61/894,315, filed Oct. 22, 2013. The entire content of the before-mentioned patent application is incorporated by reference herein.

BACKGROUND

This document relates to optical communication systems.

With the advent of transmission of multimedia content such as video over the Internet and other communications networks, there is any ever-increasing demand for increased data rate capacity on communication networks. Often, optical networks for backbones of communications network, where the increased traffic at the edges of the network aggregates to several gigabit of network traffic. Therefore, there is an increasing need for optical communication techniques to meet the demand on communications network data capacity. Laying down optical transmission media such as fiber optics often requires large amount of capital expenditure and may not always be a suitable options due to the expenses involved and other regulatory issues.

SUMMARY

The techniques disclosed in this document enable the generation and reception of optical orthogonal frequency division multiplexing (OFDM) signals in which an OFDM symbol is made up of four subcarriers, each modulated using a Quadrature Phase Shift Keying (QPSK) or a 4-QAM modulation scheme. In one advantageous aspect, the disclosed techniques can reduce the peak to average power ratio (PAPR) of the resulting signal, compared to conventional techniques, allowing for the operation of a transmitter in a linearity region of the transmit chain. In another advantageous aspect, the transmitted signal can be received at the receiver side and processed using a blind equalization technique such as the constant multi-modulus adaptive equalization algorithm (CMMA), thereby making it un-necessary to transmit training sequences or pilot tones that reduce system throughput due to transmission overhead.

In one aspect, techniques are disclosed for generating a 4-carrier Quadrature Phase Shift Keying (QPSK) Orthogonal Frequency Division Multiplexing (OFDM) signal. Four QPSK modulated subcarriers having equal symbol rates are generated. Symbols of the 4-carrier QPSK OFDM signal are produced by performing 4-point inverse Fourier Transform operations on symbols from the four QPSK modulated subcarriers. An output optical signal is transmitted using the 4-carrier QPSK OFDM signal.

In another aspect, techniques are disclosed for recovering information bits from a quad-subcarrier orthogonal frequency division multiplexed (OFDM) signal in which each subcarrier is modulated using Quadrature Phase Shift Keying (QPSK) symbols. The quad-subcarrier OFDM signal is received at a receiver. The quad-subcarrier OFDM signal is processed as a 25-Quadrature Amplitude Modulation signal to generate a modulus signal. A 4-point Fourier transform is applied to the modulus signal to recover the information bits.

These and other aspects, and their implementations and variations are set forth in the drawings, the description and the claims.

BRIEF DESCRIPTION OF THE DRAWINGS

Like reference symbols in the various drawings indicate like elements.

DETAILED DESCRIPTION

Figures 1A, 1B:
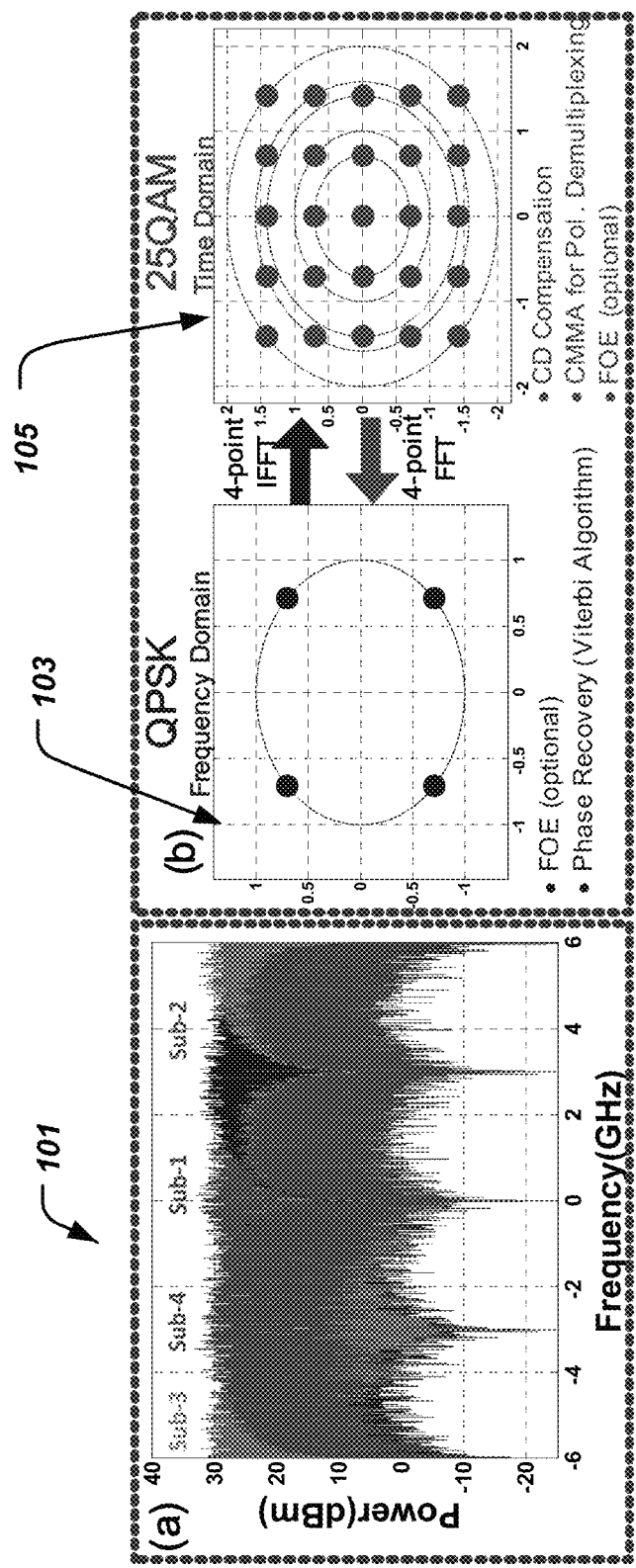
FIG. 1A depicts an example spectral distribution of the subcarriers in Quad-Carrier QPSK-OFDM signal, and FIG. 1B pictorially represents an example signal conversion between QPSK and 25-QAM.

Optical orthogonal frequency division multiplexing (OFDM) has attracted lots of attention due to its high spectral efficiency (SE) and robustness to transmission impairments enabled by digital signal processing (DSP). In the receiver of a traditional coherent OFDM transmission system, the frequency offset compensation (FOC), channel estimation, equalization, and phase recovery are implemented with training sequence (TS) and pilot tones. As the TS and pilot tones are used in the frequency domain equalization schemes, the number of subcarriers in the OFDM modulation/demodulation with IFFT/FFT (inverse fast Fourier transform, fast Fourier transform) is usually larger than 64 in order to reduce the overhead and to acquire more accurate channel estimation. Unfortunately, an OFDM signal with large IFFT/FFT size can have high peak-to-average power ratio (PAPR) values (e.g., 20 dB). A high PAPR typically leads to distortion in electrical devices, optical modulators, and fiber nonlinear effects in the optical OFDM transmission systems. If the peak of the OFDM signal is beyond the linearity area of the high power amplifiers (HPAs), the dynamic range of digital-to-analog converters (DACs), or the optical modulator, the subcarriers of the OFDM signal may lose their orthogonality. A high PAPR can also cause nonlinear effects in the fiber transmission when the optical launch power into the transmission fiber is very high.

Many techniques have been proposed to reduce the PAPR of OFDM signals by 3 to 5 dB. However, the PAPR of OFDM signal can still be very high even when these techniques. One possible approach is to reduce the number of subcarriers in the OFDM modulation. The PAPR of OFDM signal can be reduced with the reduction of the number of subcarriers. However, in conventional techniques where some subcarriers are allocated to pilot tones or training sequences, the reduction in total number of subcarriers leads to an increased overhead and the channel estimation based on TS in frequency domain cannot effectively work.

The techniques disclosed in the present document can be used to solve the above-discussed limitations of OFDM communication, and also overcome other operational issues.

In one aspect, the present document discloses an optical OFDM transmission system that achieved high data throughput using only four subcarriers in an OFDM symbol. U.S. patent application Ser. No. 14/453,471 ("the 471 App"), filed on Aug. 6, 2014, incorporated herein in its entirety, discloses a two-subcarrier OFDM scheme. Compared to two subcarriers OFDM scheme described in the 471 App, a four subcarrier OFDM scheme may be more flexible in power allocation and pre-equalization as bandwidth of each subcarrier is smaller and a greater number of subcarriers are available.

The generation (at the transmitter side) and detection (at the receiver side) of 4-subcarrier OFDM signals are further described in the present document, among other techniques. In some embodiments, four frequency-locked subcarriers may be generated. The channel spacing between the four subcarriers may be equal to the baud rate of each sub-channel in order to make the 4-subcarrier orthogonal. Such implementations may use complex circuitry. At receiver, after optical to electrical (O/E) conversion, a digital filter may be used to separate the 4-subcarriers, and then separate digital signal processing (DSP) may be performed for each subcarrier. As described in this document, a four subcarrier OFDM signal may be processed as a 25-QAM signal in the time domain, and can be blindly equalized with cascaded multi-modulus algorithm (CMMA) equalization method in the time domain. With the blind equalization in the time domain, channel estimation and equalization, FOE, and phase recovery can be implemented without TS and pilot tones. The overhead (pilot/training sequence) existing in the traditional optical OFDM transmission system can be completely eliminated in the four subcarriers optical OFDM transmission system with blind equalization.

Using the techniques described in the present document, transmission and reception of 48 Gbit/s dual-polarization Quad-Carrier QPSK-OFDM signal is possible in an optical communication network. In some embodiments, in an off-line DSP, the FOE (frequency offset estimation) is performed before 4 subcarriers are separated with FFT. Simulations and experiments performed by the inventors have shown that, compared to the traditional OFDM signal with 256 subcarriers, the PAPR of Quad-Carrier QPSK-OFDM signal with blind equalization is decreased dramatically from 14.4 dB to 6.4 dB at the probability of $1\times10^{-4}$. In optical communications networks, using some of the disclosed techniques, an 80-km single-mode fiber-28 (SMF-28) transmission can be achieved without any performance penalty (e.g., SNR or power).

Figure 9:
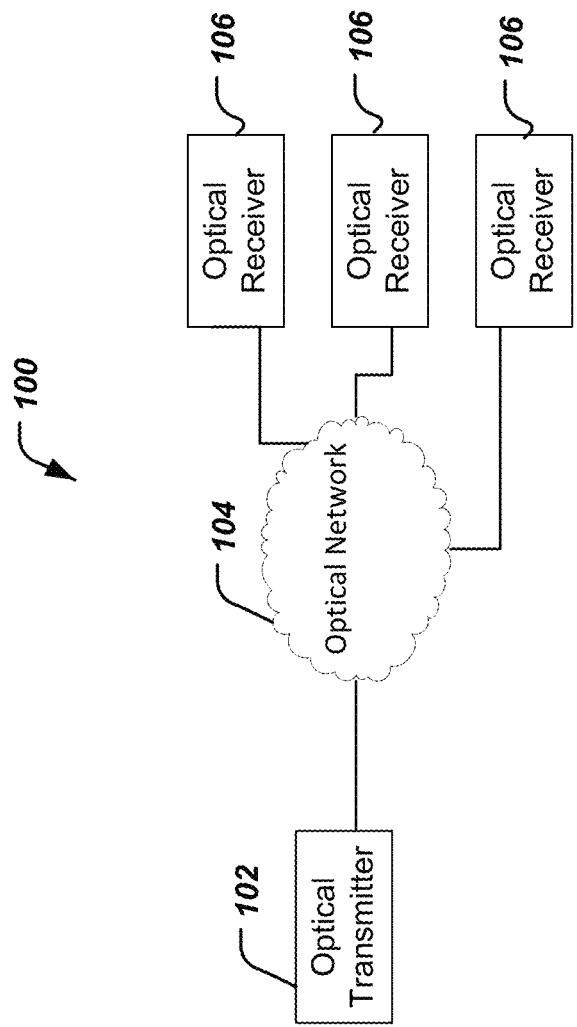
FIG. 9 depicts an architectural block diagram of an example optical communication system.

FIG. 9 is a block diagram representation of an optical communication system 100 where the subject technology of this document can be implemented. An optical transmitter 102 transmits optical signals through an optical network 104 to one or more optical transceivers 106. The transmitted optical signals may go through intermediate optical equipment such as amplifiers, repeaters, switch, etc., which are not shown in FIG. 9 for clarity.

The technique disclosed in this document can be implemented in an OFDM transmission system that uses an optical or another (e.g., over-the-air) transmission medium by using OFDM symbols consisting of only two subcarriers, e.g., at an optical transceiver 106 or at the optical transmitter 102.

Example System Configurations

FIG. 1A shows (graph 101) the spectral distribution of four subcarriers (sub-1, sub-2, sub-3 and sub-4) in a Quad-Carrier QPSK-OFDM signal with 12 Gbaud rate. The four subcarriers OFDM signal may be generated by 4-point IFFT. Assume B represents the baud rate of signal on only one subcarrier, and the total bandwidth of Quad-Carrier QPSK-OFDM signal generated in electrical domain is only 4 B.

After 4-point IFFT, QPSK data on four subcarriers in the frequency domain can be treated as a 25-QAM signal in the time domain. The constellations of QPSK in frequency domain (103) and 25-QAM in the time domain (105) are shown in FIG. 1B.

When OFDM modulation is performed, assume that the IFFT size during the OFDM modulation is N and the time length of one OFDM symbol is T. After IFFT, the OFDM signal s(t) can be expressed in time domain as:

$$s(t) = \frac{1}{\sqrt{N}} \sum_{k=0}^{N-1} c_k \exp(j2\pi f_k t) \; (0 \le t \le T-1). \quad \text{Eq. (1)}$$

where k is the index of subcarriers, $c_k$ represents data modulated on subcarriers and $f_k$ is the frequency of the kth subcarrier and can be given as $$f_k = k\Delta f = k/T. \quad \text{Eq. (2).}$$

In a 4-subcarrier scheme, the value of N and the time length of OFDM symbol are both 4 when exactly 4 subcarriers are used in OFDM modulation and demodulation, and the expression can be simplified as:

$$s(t) = \frac{1}{\sqrt{4}} \sum_{k=0}^{3} c_k \exp(j2\pi f_k t) \quad \text{Eq. (3)}$$

$$= \frac{1}{\sqrt{2}} \left( c_0 + c_1 \exp\left(j2\pi \frac{t}{4}\right) + c_2 \exp\left(j2\pi \frac{2t}{4}\right) + c_3 \exp\left(j2\pi \frac{3t}{4}\right) \right) \; (0 \le t \le 3).$$

where $C_k$ (k=0,1,2,3) represent the data modulated onto 4 subcarriers, respectively. After IFFT, the OFDM symbols are generated and one OFDM symbol includes four samples. The four samples can be expressed as:

$$s(0) = \frac{1}{2}(c_0 + c_1 + c_2 + c_3), \quad s(1) = \frac{1}{2}(c_0 + jc_1 - c_2 - jc_3), \quad \text{Eq. (4)}$$

$$s(2) = \frac{1}{2}(c_0 - c_1 + c_2 - c_3), \quad s(3) = \frac{1}{2}(c_0 - jc_1 - c_2 + jc_3).$$

With 25 possible values, the QPSK signal after 4-point IFFT appears to be a 25-QAM like signal in the time domain (i.e., time domain plot of all possible values has the appearance of a frequency domain plot of a 25 QAM signal).

In some embodiments, two Quad-Carrier QPSK OFDM signal may further be multiplexed using polarization multiplexing such as dual polarization. Higher levels of polarization domain multiplexing (e.g., four or eight signals) are also possible.

In a dual-polarization Quad-Carrier QPSK-OFDM signal transmission system, DSP algorithms may be used to realize de-multiplexing, FOE, channel estimation and phase recovery. In a traditional optical OFDM system, channel estimation and equalization may be implemented in the frequency domain with known training sequences and pilot tones, e.g., time-interleaved TSs are inserted to finish de-multiplexing, FOE, and channel estimation and the pilot tones are reserved for phase recovery. If frequency domain equalization based DSP algorithms are applied in the dual-polarization Quad-Carrier QPSK-OFDM signal transmission system, the SE can reduce as the overhead occupies a large portion of the total transmission resources.

In order to avoid such overhead of training/pilot signals, a time domain blind equalization technique can be used to recover a dual-polarization Quad-Carrier QPSK-OFDM signal as a 25-QAM signal. In the blind equalization, the CMMA algorithm may be used to implement the polarization de-multiplexing and channel estimation. The 471 App discloses various embodiments of the CMMA technique.

In some embodiments, a 4-th power method may be applied to estimate the frequency offset between the signal and the LO, and 4-th power method can be performed on either 25-QAM signal before 4-point FFT or QPSK signal after 4-point IFFT. In some embodiments, for the phase recovery, Viterbi algorithm may be utilized to cancel the phase noise of QPSK signal after 4-point IFFT. In some embodiments, for the CMMA algorithm, the inner three rings/radii for the error signal calculation may be selected only to increase equalizer robustness which is the same as CMMA algorithm for 9-QAM signal.

Briefly, the CMMA algorithm could be operated upon 4 symbol QAM constellation, which could be considered mathematically to be a 4 Quadrature Phase Shift Keying (4 QPSK) signal. The 25 QAM resulting time domain constellation, after performing a 4 point inverse Fourier Transform (e.g., inverse Fast Fourier Transform IFFT), can then be recovered using CMMA algorithm. Further details of CMMA are provided in the 471 App. In "64-Tb/s, 8/b/s/Hz, PDM-36QAM Transmission Over 320 Km Using Both Pre- and Post-Transmission Digital Signal Processing," by Zhou et al., Journal of Lightwave Technology, Vol. 29, No. 4, Feb. 15, 2011 ("the Zhou Paper"), incorporated herein by reference in its entirety, a technique in which two inner rings are used for error signal calculation in a high order QAM signal reception is disclosed. In some embodiments, e.g., high order QAM techniques, e.g., 25 QAM technique disclosed in the present document, inner 3 rings may be used for error signal calculation. When three modulus rings of constellation are used, the CMMA processing may be similar to the algorithm described in the 9-QAM case of the 471 App.

Figure 2:
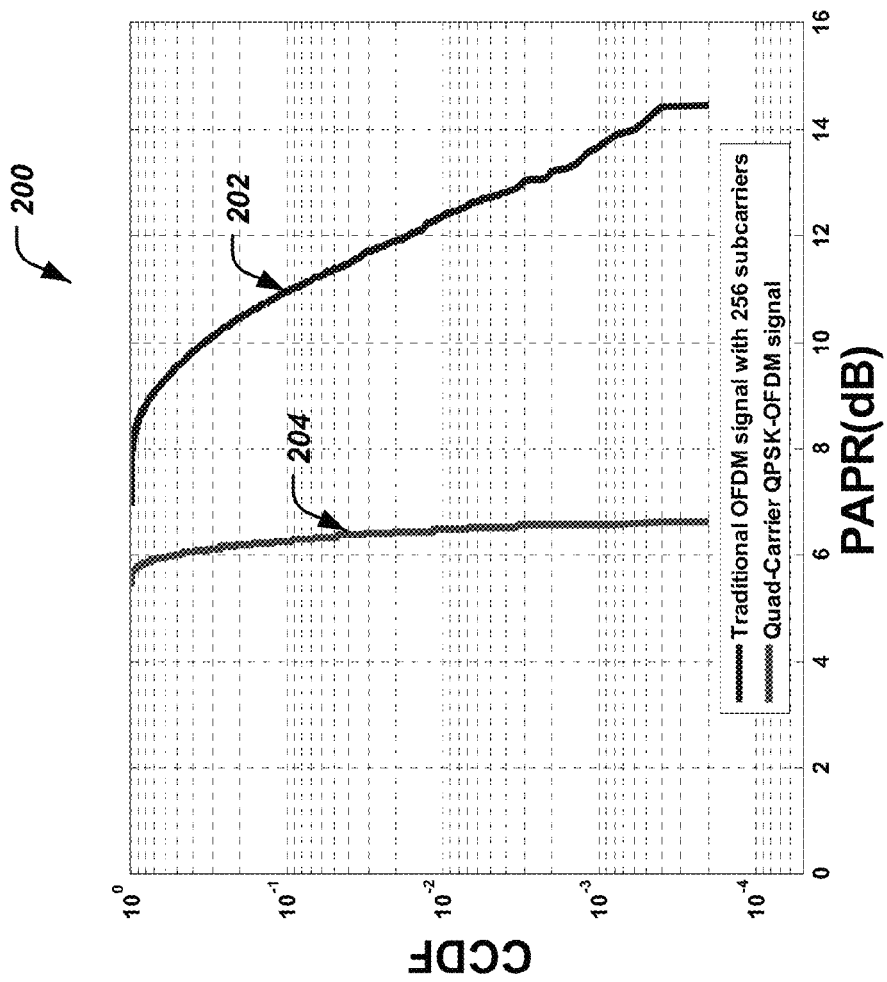
FIG. 2 depicts examples of complementary cumulative density functions (CCDFs) of a QPSK-OFDM signal with 256 subcarriers and a Quad-Carrier QPSK-OFDM signal.

FIG. 2 shows a graph 200 in which the PAPR of a Quad-Carrier QPSK-OFDM signal (curve 204) and a traditional QPSK-OFDM signal (curve 202) are presented for a comparison. In FIG. 2, the PAPR performance is evaluated by complementary cumulative distribution function (CCDF). The CCDF presents the probability distribution in which the PAPR of current OFDM symbol is higher than certain threshold. The CCDF curves 202 and 204 of PAPR for traditional QPSK-OFDM signal with 256 subcarriers and Quad-Carrier QPSK-OFDM show that the PAPR of Quad-Carrier QPSK-OFDM signal (204) outperforms the traditional OFDM (202) and there is an improvement of 8 dB in the PAPR at the probability of $1\times10^{-4}$.

Example Setup

Figure 3:
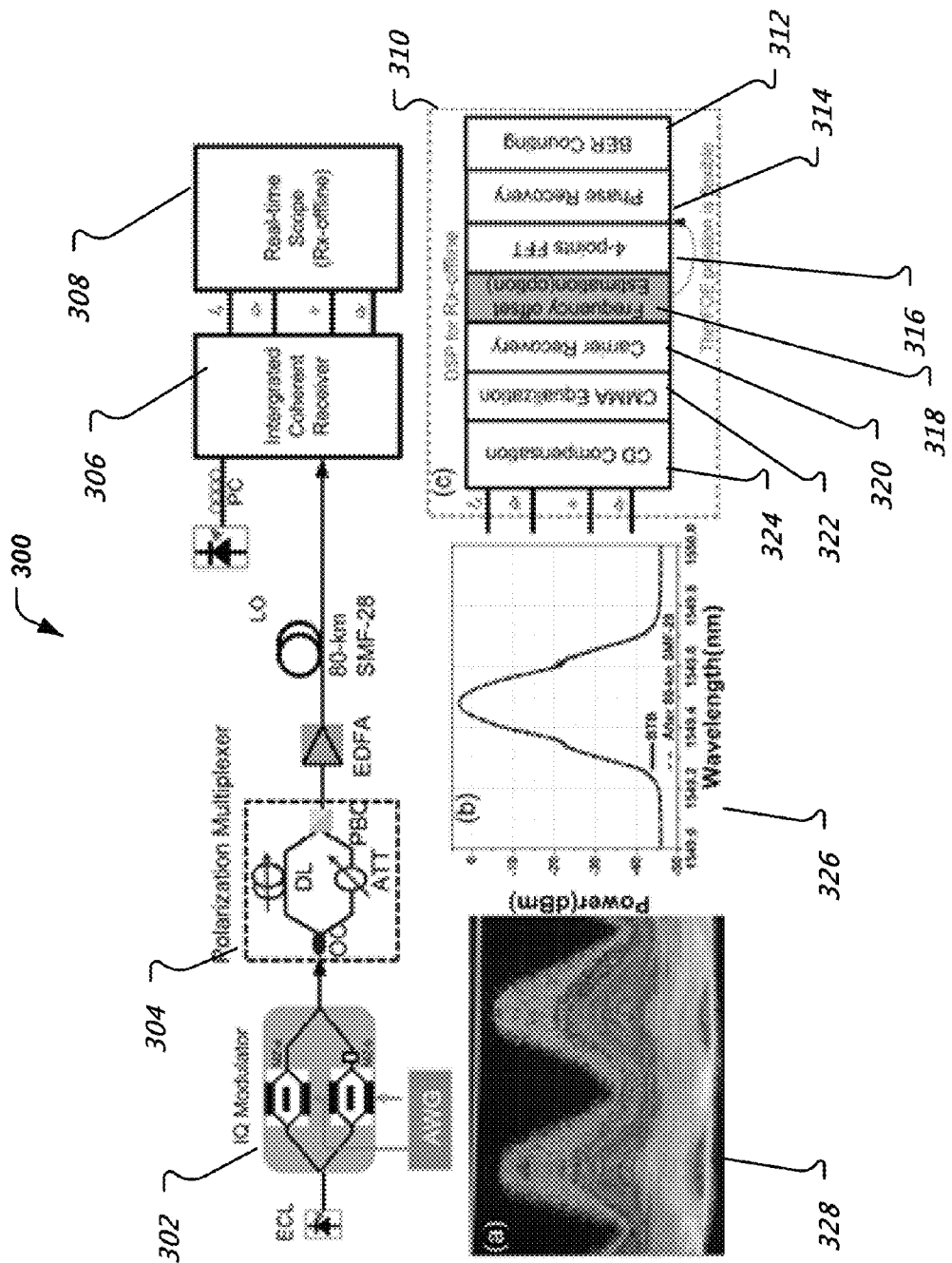
FIG. 3 is a block diagram representation of an example of an experimental setup.

FIG. 3 shows an example Quad-Carrier QPSK-OFDM signal transmission system 300. At the transmitter, an external cavity laser (ECL) at 1549.48 nm with less than 100-kHz linewidth and maximum output power of 14.5 dBm is modulated by I/Q modulator (302) driven by an electrical baseband OFDM signal. For simulations, the OFDM signal can be generated using software packages such as MATLAB and then uploaded into an arbitrary waveform generator (AWG) with a 12-GSa/s sample rate. In some embodiments, the Quad-Carrier QPSK-OFDM signal without additional CP and TS and the signal may be equalized with CMMA blind equalization method at the receiver-side. For optical OFDM modulation, two parallel Mach-Zehnder modulators (MZMs) in I/Q modulator may both be biased at the null point and the phase difference between the upper and lower branches of I/Q modulator may be controlled at $\pi/2$ (302). The polarization multiplexing 304 may be realized by a polarization multiplexer module, comprising a polarization-maintaining optical coupler (OC) to halve the signal into two branches, an optical delay line (DL) to remove the correlation between X-polarization and Y-polarization by providing a 150 symbols delay, an optical attenuator to balance the power of two branches and a polarization beam combiner (PBC) to recombine the signal. The generated signal may be boosted via an erbium doped fiber amplifier (EDFA) before launched into 80 km SMF-28.

At the receiver side, the output signal may be injected into the integrated coherent receiver 306 to implement optical to electrical detection. After integrated coherent receiver 306, the signal may be captured by the real-time oscilloscope 308 with 50 GSa/s sample rate. The resolution of DAC in the AWG and ADC in real-time oscilloscope is typically 10 and 8 bits, respectively.

The optical eye diagram of Quad-Carrier QPSK-OFDM signal is inserted as inset (a) 328 in FIG. 3. The optical spectra before and after 80-km SMF-28 transmission with 0.1-nm resolution are shown in 326. It will be appreciated by one of skill in the art that there is no optical signal to noise ratio (OSNR) degradation observed after 80-km SMF-28 transmission.

The DSP 310 may be used for receiver (Rx) processing (offline, in case of an experimental setup) of the Quad-Carrier QPSK-OFDM signal. At the Rx, the 25-QAM Quad-Carrier QPSK-OFDM signal can be equalized with CMMA method (322) without additional overhead compared to traditional OFDM signal with frequency domain equalization. In some experimental setups, after the optical link, four signal components may be first captured by the Real-time Scope with 50 GSa/s sample rate (308). A T/2-spaced time-domain FIR filter may be used for chromatic dispersion (CD) compensation (324), where the filter coefficients may be calculated from the known fiber CD transfer function using the frequency-domain truncation method. The CMMA 322 may be used to retrieve the modulus of the polarization-division-multiplexed 25-QAM (PDM-25QAM) signal and realize polarization de-multiplexing. Carrier recovery may also be performed (320). The subsequent step is to realize the FOE (318), and here we have to claim the position of FOE is flexible and it can also be done after 4-point IFFT. After these procedures, 4-point FFT is applied (318) to convert the 25-QAM signal in time domain into a QPSK signal in frequency domain and then the bit-error ratio (BER) can also be obtained with the BER counting (312) after QPSK signal phase recovery (314).

Figure 4:
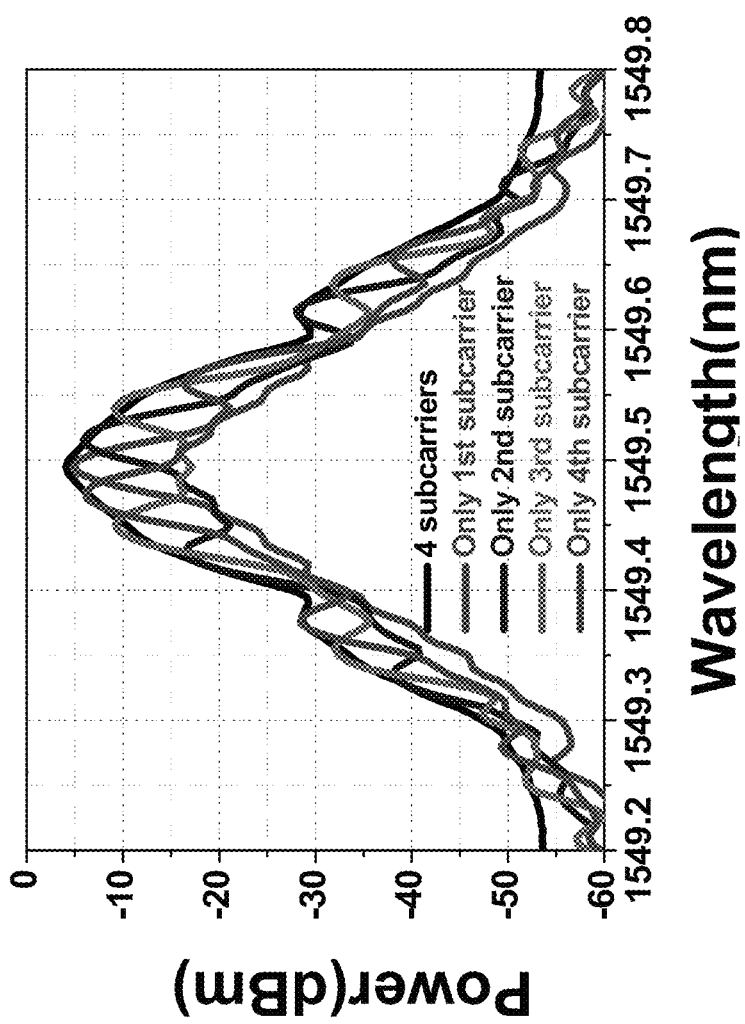
FIG. 4 depicts examples of optical spectrums of different subcarriers drawn to a 0.01-nm scale.

Because blind equalization is applied for Quad-Carrier QPSK-OFDM signal, there is no overhead and the data throughput capacity is 48 Gbit/s (matching available transmission throughput). In the setup 300, the BER is counted over $10 \times 10^6$ bits (10 data sets, and each set contains $10^6$ bits). The optical spectrum of different sub-carriers is shown in the FIG. 4 with 0.01 nm resolution, and it can be seen that the distribution of subcarriers in optical domain is the same as that in the electrical domain demonstrated in the FIG. 1A.

Example Experimental Results

Figures 5A, 5B:
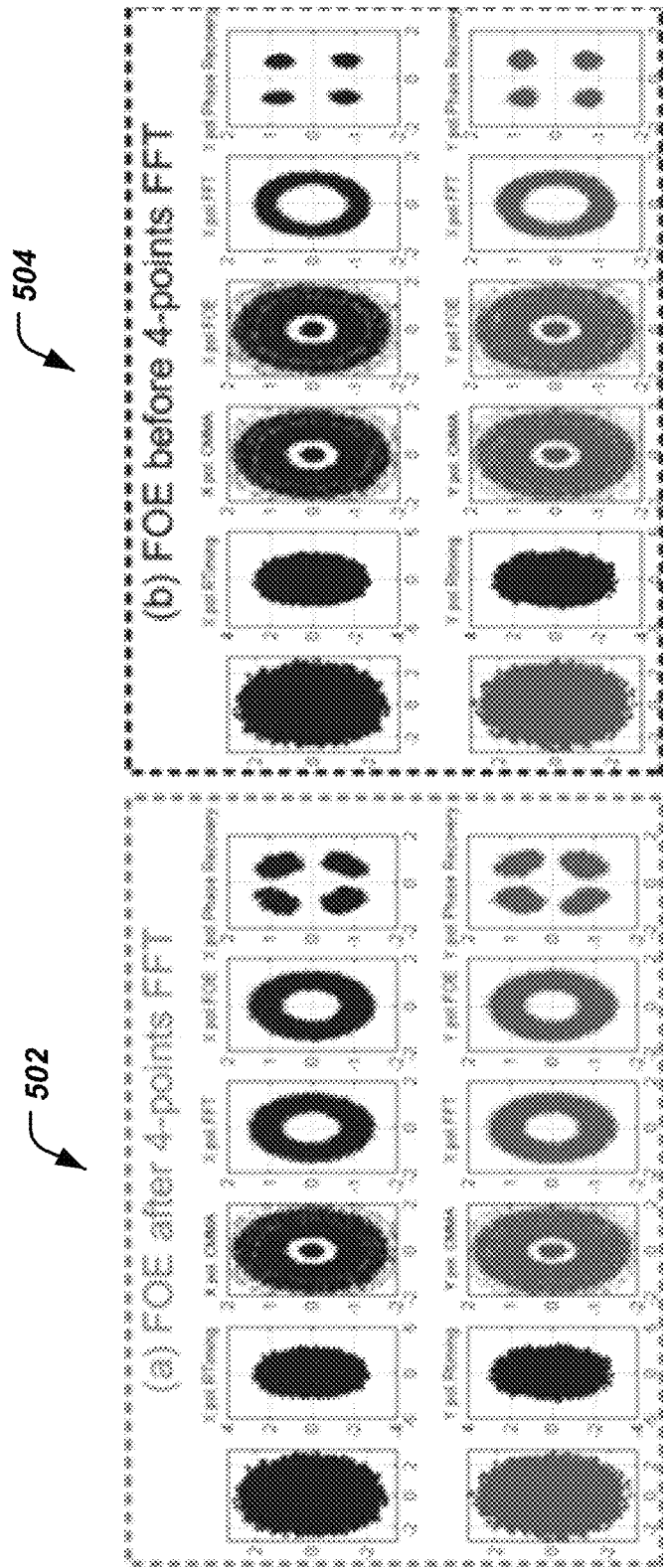
FIGS. 5A-5B depict example signal constellations in different stages of DSP: (A) FOE after 4-point FFT, and (B) FOE before 4-point FFT.

FIG. 5A and FIG. 5B show the constellations of Quad-Carrier QPSK-OFDM signal with OSNR of 20 dB in different stages of the offline DSP, which is described with respect to FIG. 3. In FIG. 5A 502, results are shown from an embodiment in which the FOE is done after 4-point FFT in the Rx offline DSP. While in FIG. 5B 504, FOE is completed before 4-point FFT. Compared to the constellations after phase recovery in FIG. 5A, those in FIG. 5B have converged to better defined constellations, which means the FOE should be done before 4-point FFT. As FFT is not a linear transformation and may cause the spread of noise induced by frequency offset, it may be advantageous to finish the FOE before the FFT in the time domain.

Figure 6:
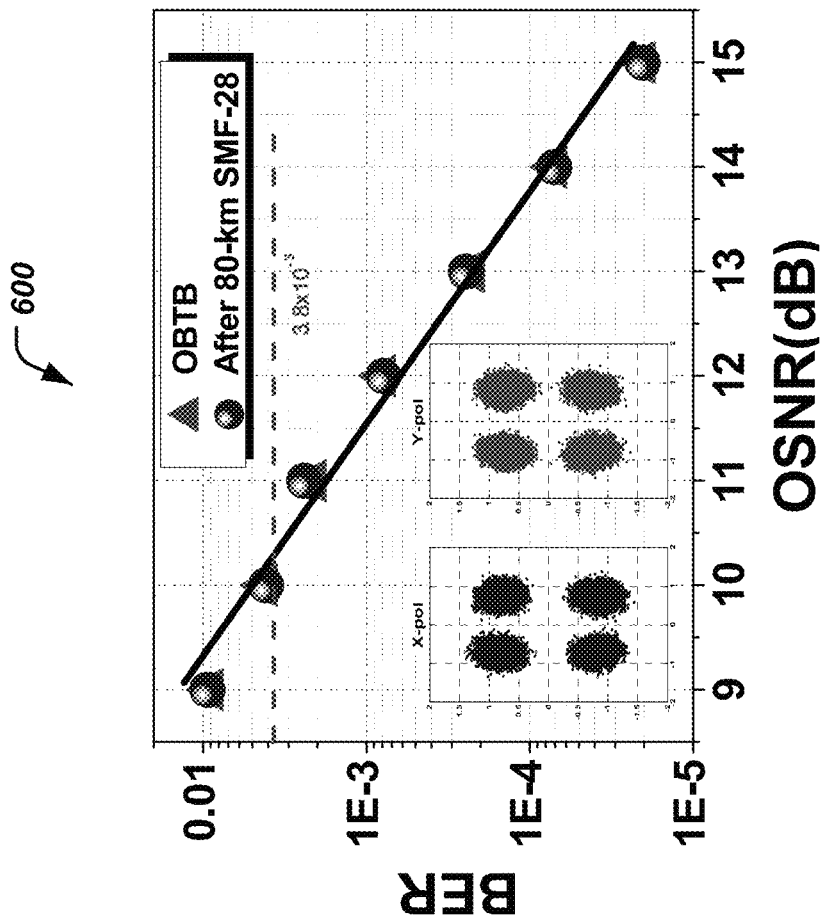
FIG. 6 depicts examples of measured BER of Quad-Carrier QPSK-OFDM signal versus OSNR.

FIG. 6 shows a graph 600 of the measured BER of Quad-Carrier QPSK-OFDM signal versus OSNR. It can be seen that there is nearly no OSNR penalty observed after 80-km SMF-28 transmission. The BER for the 48-Gbit/s dual polarization Quad-Carrier QPSK-OFDM signal is less than the pre-forward-error-correction (7% overhead) threshold of $3.8 \times 10^{-3}$ when the OSNR is higher than 10 dB after 80-km SMF-28 transmission. The constellations of dual polarization Quad-Carrier QPSK-OFDM signal after phase recovery with OSNR of 17 dB after 80-km SMF-28 transmission are shown in the inset of FIG. 6.

In the back to back (BTB) case (e.g., when both the transmitter and the receiver side are known and controllable), the receiver bandwidth may be adjusted via changing the bandwidth of the real-time oscilloscope to determine the minimum bandwidth for the 48-Gbit/s Quad-Carrier QPSK-OFDM signal transmission.

Figure 7:
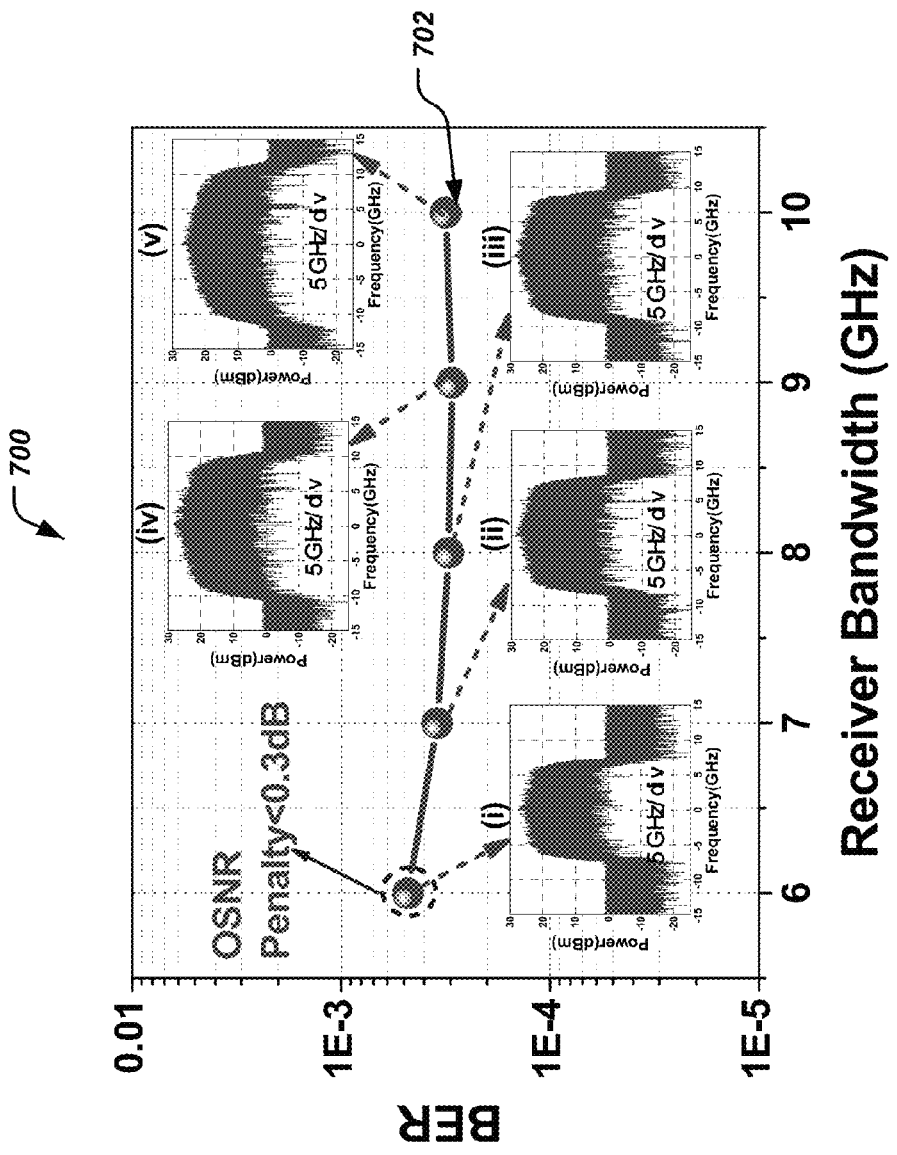
FIG. 7 depicts examples of measured BER versus receiver bandwidth.

FIG. 7 is a graph 700 that shows measured BER versus receiver bandwidth (curve 702). Compared to the situation that the receiver bandwidth is set larger than 6 GHz (7, 8, 9 or 10 GHz), there is less than 0.3 dB OSNR penalty when the bandwidth of the receiver is set to 6 GHz according to the relationship between OSNR and BER shown in FIG. 6. The electrical spectra of the obtained signal with different receiver bandwidth are inserted as insets (i)-(v) in FIG. 7 (6, 7, 8, 9, and 10 GHz respectively).

Figure 8:
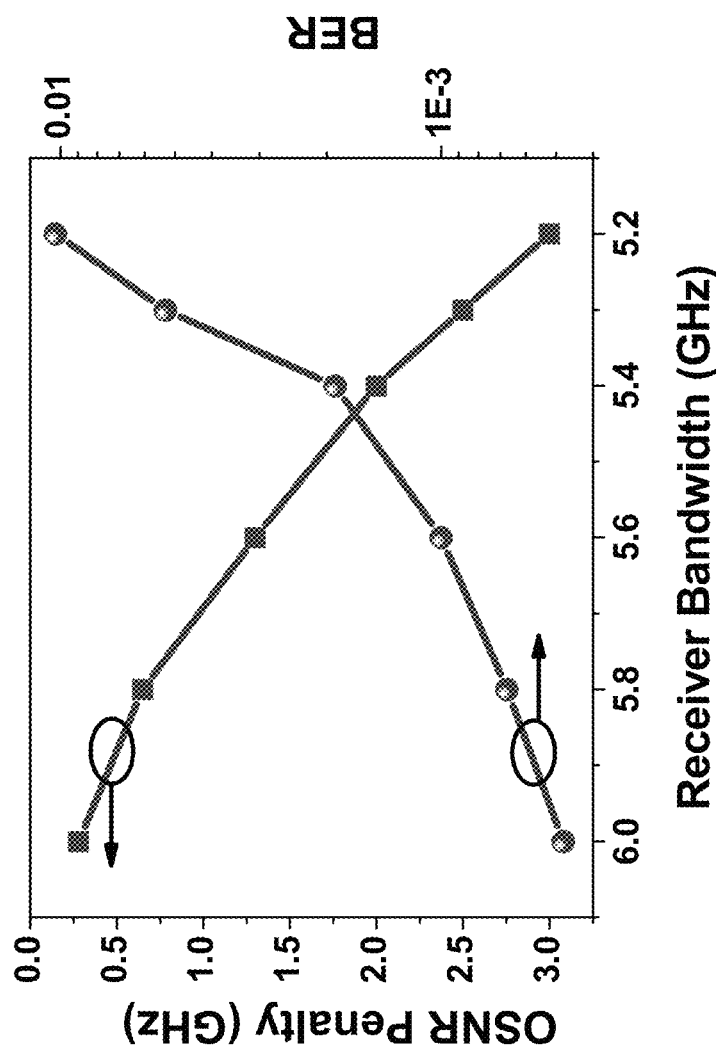
FIG. 8 depicts an example measured OSNR penalty and BER when the receiver bandwidth is set between 5 and 6 GHz.

The receiver bandwidth of a real-time oscilloscope typically can be only changed by integer GHz interval. When set to 5 GHz, it was found that the signal could not be recovered with 5-GHz receiver bandwidth. The OSNR penalty and BER versus receiver bandwidth when the bandwidth is set between 5 and 6 GHz are measured and shown in the FIG. 8. The fractional change of the receiver bandwidth may be virtually realized via an additional low pass filter (LPF), and during this virtual realization the frequency offset of two lasers in the experiment may be maintained to be close to 0. The received sample for the test is the data obtained with 10 GHz bandwidth receiver. The signal cannot be meaningfully recovered if the bandwidth of receiver is smaller than 5.2 GHz, in this case some useful spectral components are filtered out due to the inadequate bandwidth, and so the Quad-Carrier QPSK-OFDM signal cannot be correctly recovered. There is 3-dB OSNR penalty when the bandwidth of the LPF is only 5.2 GHz and the BER is $1.02 \times 10^{-2}$.

Figure 10:
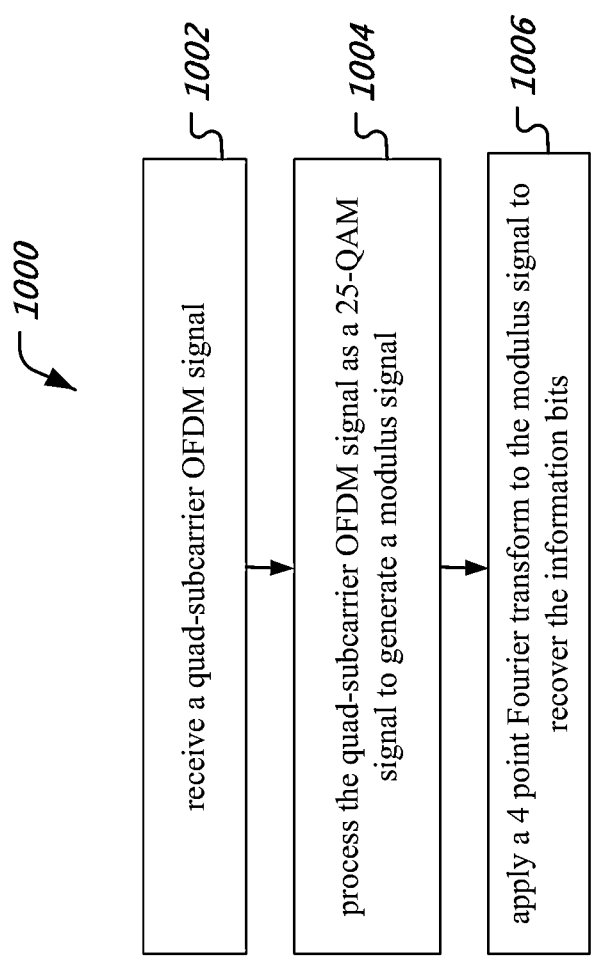
FIG. 10 is a flow chart representation of an exemplary optical communication method.

FIG. 10 is a flowchart representation of an example method 1000 of recovering information bits from a quad-subcarrier orthogonal frequency division multiplexed (OFDM) signal in which each subcarrier is modulated using Quadrature Phase Shift Keying (QPSK) symbols. The method 1000 may be performed, e.g., at the optical receivers 106.

At 1002, the method 1000 receives a quad-subcarrier OFDM signal. As disclosed in the present document, the quad-subcarrier OFDM signal may be, e.g., a QPSK signal or a 4-QAM signal.

At 1004, the method 1000 processes the quad-subcarrier OFDM signal as a 25-Quadrature Amplitude Modulation signal to generate a modulus signal. The 471 App provides examples of a cascaded multi-modulus algorithm that can be used to perform signal processing operations on the received signal by treating the received signal as being a 9 QAM signal, for the case of 4-QAM modulation. A similar technique can be used by treating the processing of quad-subcarrier signal as 25-QAM signal. The CMMA may include performing channel equalization of the received 4-subcarrier OFDM signal to obtain a set of channel estimation coefficients and a stream of symbols, partitioning, based on a modulus of the stream of symbols, the stream of symbols into a plurality of partitions, estimating a carrier frequency offset based on the partitioned stream of symbols and recovering a phase of the received two-subcarrier OFDM signal using a maximum likelihood algorithm. As further disclosed in the 471 App, constellation points (symbols) may be rotated during the receiver processing. In some embodiments, the rotation may be performed during carrier frequency offset estimation. In some embodiments, the rotation may be performed during phase recovery. The rotation may make signals more amenable for processing.

At 1006, the method 1000 applies a 4 point Fourier transform to the modulus signal to recover the information bits. In some embodiments, the method 1000 uses a CMMA technique in which channel equalization of the received quad-subcarrier OFDM signal is performed to obtain a set of channel estimation coefficients and a stream of symbol. In one advantageous aspect, the channel equalization may be blind, thereby making in un-necessary to use training sequences or pilot signals. The stream of symbols that is obtained after channel equalization may be partitioned into a plurality of partitions based on their modulus. For example, graph 105 shows partitioning the 25 QAM constellation points into 6 circles (the innermost circle being the origin of the graph), based on modulus of the symbols. In some embodiments, FOE (carrier frequency offset estimation) may be performed based on the partitioned stream of symbols. In some embodiments, the CMMA further includes recovering phase of the received quad-subcarrier OFDM signal using a technique such as a maximum likelihood technique. In some embodiments, some of the stream of symbols may be rotated during the FOE estimation. In some embodiments, the rotation may be performed during the operation of phase recovery.

Figure 11:
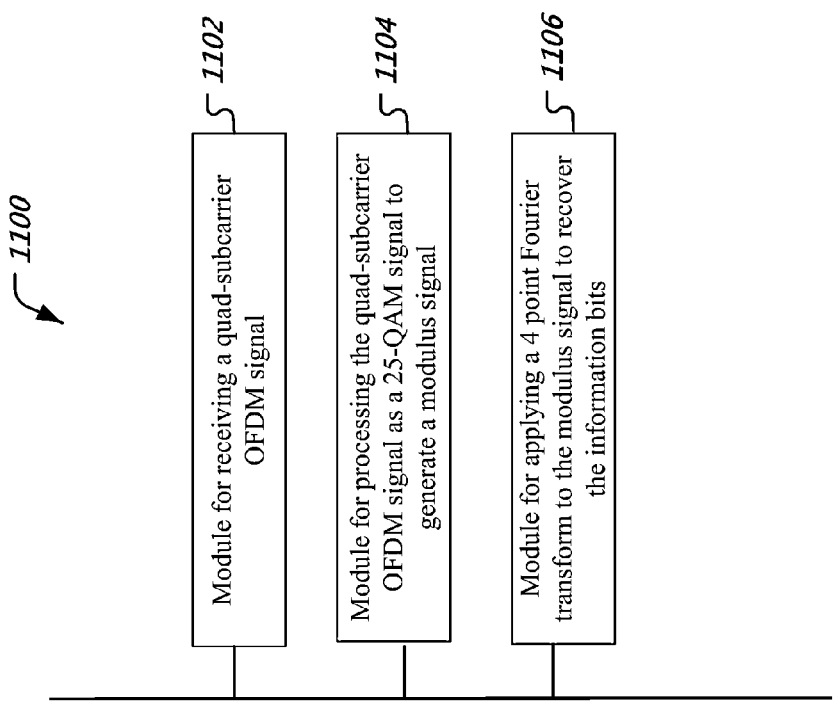
FIG. 11 is a block diagram representation of an exemplary optical communication apparatus.

FIG. 11 is a block diagram representation of an exemplary apparatus 1100 for recovering information bits from a quad-subcarrier orthogonal frequency division multiplexed (OFDM) signal in which each subcarrier is modulated using Quadrature Phase Shift Keying (QPSK) symbols. The module 1102 is for receiving the quad-subcarrier OFDM signal. The module 1104 is for processing the quad-subcarrier OFDM signal as a 25-Quadrature Amplitude Modulation signal to generate a modulus signal. The module 1106 is for applying a 4 point Fourier transform to the modulus signal to recover the information bits. In various embodiments, the apparatus 1100 and modules 1102, 1104, 1106 may be configured to perform some of the operations disclosed in the present document.

Figure 12:
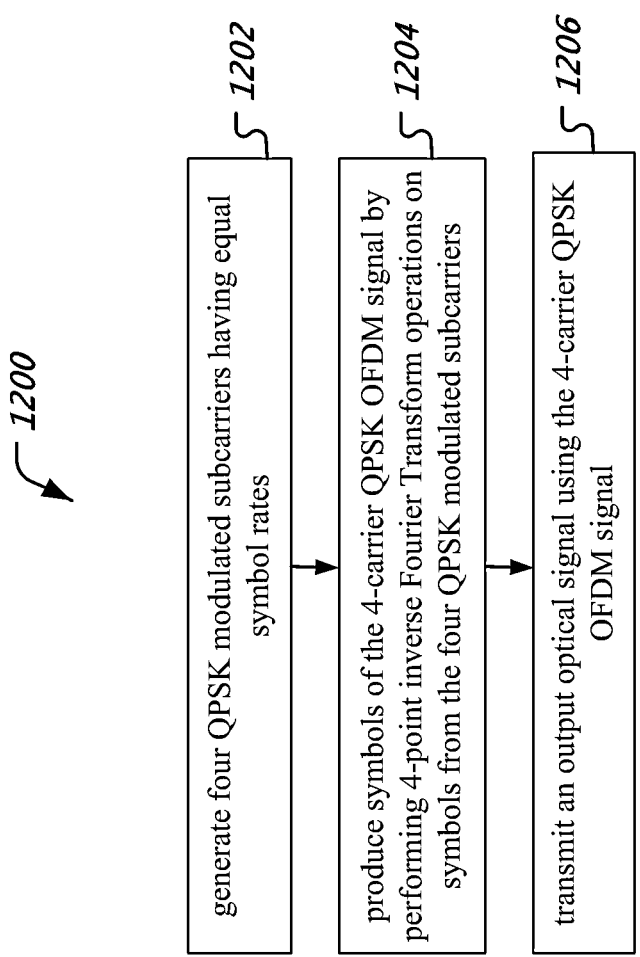
FIG. 12 is a flow chart representation of an exemplary optical communication method.

FIG. 12 is a flowchart representation of an exemplary method 1200 of generating a 4-carrier Quadrature Phase Shift Keying (QPSK) Orthogonal Frequency Division Multiplexing (OFDM) signal, comprising:

At 1202, the method 1200 generates four QPSK modulated subcarriers having equal symbol rates.

At 1204, the method 1200 produces symbols of the 4-carrier QPSK OFDM signal by performing 4-point inverse Fourier Transform operations on symbols from the four QPSK modulated subcarriers.

At 1206, the method 1200 transmits an output optical signal using the 4-carrier QPSK OFDM signal.

In some embodiments, multiple 4-carrier QPSK OFDM signals may be multiplexed in the polarization domain. In some embodiments, the method 1200 may refrain from transmitting a training sequence and/or a pilot signal. As previously disclosed, a receiver may be able to perform blind equalization using CMMA, without deriving any benefits from training sequences and pilot signals.

Figure 13:
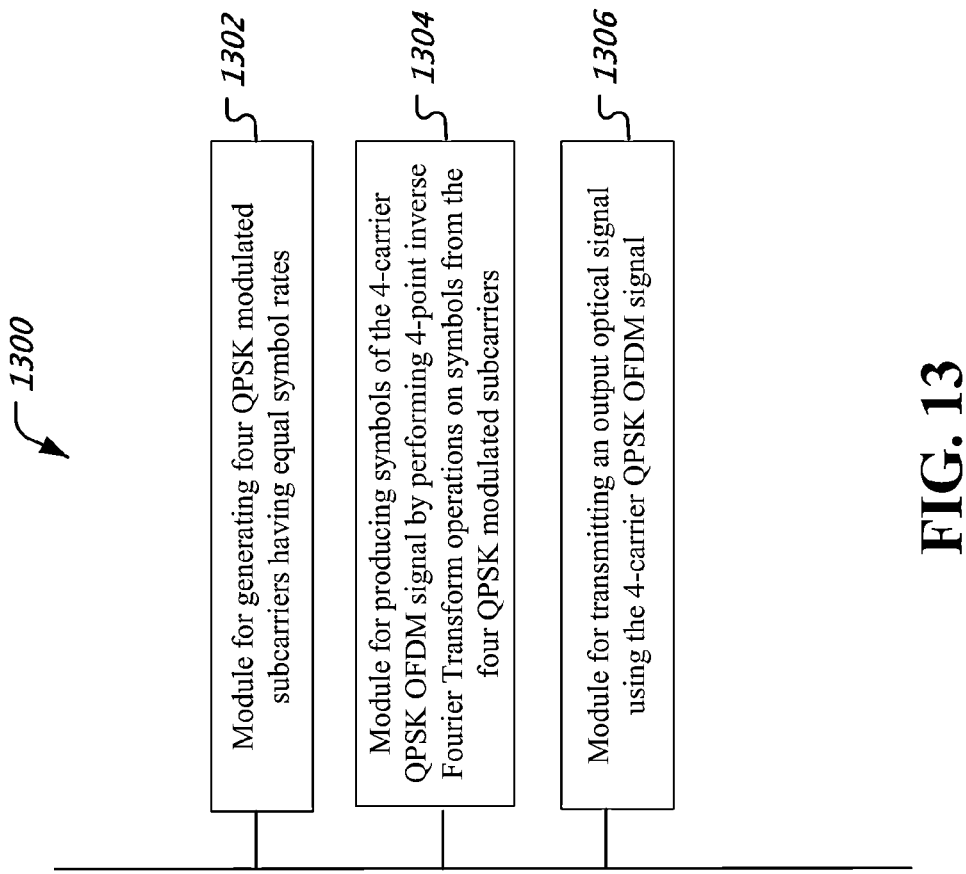
FIG. 13 is a block diagram representation of an exemplary optical communication apparatus.

FIG. 13 is a block diagram representation of an exemplary apparatus 1300 for generating a 4-carrier Quadrature Phase Shift Keying (QPSK) Orthogonal Frequency Division Multiplexing (OFDM) signal. The module 1302 is for generating four QPSK modulated subcarriers having equal symbol rates. The module 1304 is for producing symbols of the 4-carrier QPSK OFDM signal by performing 4-point inverse Fourier Transform operations on symbols from the four QPSK modulated subcarriers. The module 1306 is for transmitting an output optical signal using the 4-carrier QPSK OFDM signal. In various embodiments, the apparatus 1300 and modules 1302, 1304, 1306 may further perform some of the techniques disclosed in the present document.

It will be appreciated that, Quad-Carrier QPSK-OFDM signal transmission and reception is successfully demonstrated with blind equalization without any overhead. The phase recovery can be implemented with simple Viterbi algorithm and the FOE can be done before 4 subcarriers are separated with FFT. Using these techniques, we successfully generate and transmit 48-Gbit/s Quad-Carrier QPSK-OFDM signal over 80-km SMF-28 without penalty.

It will further be appreciated that techniques transmitting optical OFDM communication signals without having to incur overheads of pilot tones and training sequences are disclosed. A 4-subcarriers OFDM signal is used for carrying information bits from a transmitter to a receiver. At the receiver, the signal is received and processed using a blind equalization method in which receiver processing is performed on the signal to recover information by treating the received signal as having 25-QAM constellation points.

It will further be appreciated that while the disclosed embodiments are described with reference to optical communication, the disclosed signal processing techniques apply equally well to any other OFDM communication medium, e.g., copper wire, coaxial cable or air medium (wireless).

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus. The term "exemplary" is used to denote that the corresponding embodiment is an example embodiment, with no connotation that the described embodiment is necessarily a best of its kind or a preferred or a desired embodiment.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of recovering information bits from a quad-subcarrier orthogonal frequency division multiplexed (OFDM) signal in which each subcarrier is modulated using Quadrature Phase Shift Keying (QPSK) symbols, comprising:
receiving the quad-subcarrier OFDM signal;
processing the quad-subcarrier OFDM signal as a 25-Quadrature Amplitude Modulation signal to generate a modulus signal; and
applying a 4 point Fourier transform to the modulus signal to recover the information bits.

2. The method of claim 1, wherein the processing comprises using a cascaded multi-modulus algorithm (CMMA), wherein the CMMA comprises:
performing channel equalization of the received quad-subcarrier OFDM signal to obtain a set of channel estimation coefficients and a stream of symbols;
partitioning, based on a modulus of the stream of symbols, the stream of symbols into a plurality of partitions;
estimating a carrier frequency offset based on the partitioned stream of symbols; and
recovering a phase of the received quad-subcarrier OFDM signal using a maximum likelihood algorithm.

3. The method of claim 2, further including:
rotating at least some symbols from the stream of symbols.

4. The method of claim 3, wherein the rotating operation is performed during the operation of estimating the carrier frequency offset.

5. The method of claim 3, wherein the rotating operation is performed during the operation of recovering the phase of the signal.

6. An optical receiver apparatus for recovering information bits from a quad-subcarrier orthogonal frequency division multiplexed (OFDM) signal in which each subcarrier is modulated using Quadrature Phase Shift Keying (QPSK) symbols, comprising:
an optical receiver module that receives the quad-subcarrier OFDM signal;
a receiver processing module that processes the quad-subcarrier OFDM signal as a 25-Quadrature Amplitude Modulation signal to generate a modulus signal; and
a Fourier transform module that applies a 4 point Fourier transform to the modulus signal to recover the information bits.

7. The apparatus of claim 6, wherein the processing comprises using a cascaded multi-modulus algorithm (CMMA), wherein the CMMA comprises:
performing channel equalization of the received quad-subcarrier OFDM signal to obtain a set of channel estimation coefficients and a stream of symbols;
partitioning, based on a modulus of the stream of symbols, the stream of symbols into a plurality of partitions;
estimating a carrier frequency offset based on the partitioned stream of symbols; and
recovering a phase of the received quad-subcarrier OFDM signal using a maximum likelihood algorithm.

8. The apparatus of claim 7, further including:
a rotation module that rotates at least some symbols from the stream of symbols.

9. The apparatus of claim 8, wherein the rotation module performs the rotating operation during the operation of estimating the carrier frequency offset.

10. The apparatus of claim 8, wherein the rotation module performs the rotating operation during the operation of recovering the phase of the signal.

11. An optical communication method of generating a 4-carrier Quadrature Phase Shift Keying (QPSK) Orthogonal Frequency Division Multiplexing (OFDM) signal, comprising:
generating four QPSK modulated subcarriers having equal symbol rates;
producing symbols of the 4-carrier QPSK OFDM signal by performing 4-point inverse Fourier Transform operations on symbols from the four QPSK modulated subcarriers; and
transmitting an output optical signal using the 4-carrier QPSK OFDM signal.

12. The method of claim 11, further comprising:
multiplexing, using polarization domain multiplexing the 4-carrier QPSK OFDM signal with another 4-carrier QPSK OFDM signal to produce the output optical signal.

13. The method of claim 11, wherein the transmitting operation comprises refraining from transmitting a training sequence signal.

14. The method of claim 11, wherein the transmitting operation comprises refraining from transmitting a pilot signal.

15. An optical communication apparatus for generating a 4-carrier Quadrature Phase Shift Keying (QPSK) Orthogonal Frequency Division Multiplexing (OFDM) signal, comprising:
an I-Q modulation module that generates four QPSK modulated subcarriers having equal symbol rates;
an IFFT module that produces symbols of the 4-carrier QPSK OFDM signal by performing 4-point inverse Fourier Transform operations on symbols from the four QPSK modulated subcarriers; and
a transmitter module that transmits an output optical signal using the 4-carrier QPSK OFDM signal.

16. The apparatus of claim 15, further comprising:
a polarization multiplexer module that multiplexes, using polarization domain multiplexing the 4-carrier QPSK OFDM signal with another 4-carrier QPSK OFDM signal to produce the output optical signal.

17. The apparatus of claim 15, wherein the transmitter module refrains from transmitting a training sequence signal.

18. The apparatus of claim 15, wherein the transmitter module refrains from transmitting a pilot signal.

19. The apparatus of claim 15, wherein the polarization multiplexer module includes:
- a polarization-maintaining optical coupler (OC) to halve the signals into two branches;
- an optical delay line (DL) to remove the correlation between X-polarization and Y-polarization by providing a delay;
- an optical attenuator to balance the power of two branches; and
- a polarization beam combiner (PBC) to recombine the polarized signals.

20. An optical communication system, comprising:
an optical transmission medium;
an optical transmission apparatus that transmits, over the optical transmission medium, a 4-carrier Quadrature Phase Shift Keying (QPSK) Orthogonal Frequency Division Multiplexing (OFDM) signal in which each subcarrier is modulated using a QPSK constellation without transmitting a training sequence and a pilot signal; and
an optical receiver apparatus that:
receives the 4-carrier QPSK OFDM signal;
processes the 4-carrier QPSK OFDM signal as a 25-Quadrature Amplitude Modulation signal to generate a modulus signal; and
applies a 4 point Fourier transform to the modulus signal to recover the information bits.

* * * * *